United States Patent [19]

Dutton et al.

[11] 3,931,029
[45] Jan. 6, 1976

[54] CORROSION INHIBITED ANTIFREEZE COMPOSITIONS AND PROCESS FOR INHIBITING THE CORROSION OF SOLDER ALLOYS

[75] Inventors: Daniel R. Dutton, Woodhaven; John W. Compton, Taylor, both of Mich.

[73] Assignee: BASF Wyandotte Corporation, Wyandotte, Mich.

[22] Filed: Oct. 15, 1974

[21] Appl. No.: 514,822

[52] U.S. Cl. .................. 252/76; 252/77; 252/79; 252/392; 252/396
[51] Int. Cl.² .................. C09K 5/00; C23F 11/12
[58] Field of Search ......... 252/79, 76, 77, 392, 396; 21/27 R; 260/514 K, 557 R

[56] References Cited
UNITED STATES PATENTS

| | | | |
|---|---|---|---|
| 2,632,695 | 3/1953 | Landis et al. | 252/396 X |
| 2,737,497 | 3/1956 | Wasson et al. | 252/76 |
| 3,238,136 | 3/1966 | Willard et al. | 252/75 |
| 3,705,109 | 12/1972 | Hausler et al. | 252/392 |
| 3,734,859 | 5/1973 | Ward | 260/514 K X |
| 3,753,968 | 8/1973 | Ward | 260/97.6 |
| 3,763,053 | 10/1973 | Bills | 252/357 |

FOREIGN PATENTS OR APPLICATIONS

| | | | |
|---|---|---|---|
| 515,720 | 8/1955 | Canada | 252/396 |

OTHER PUBLICATIONS
Westvaco Product Data Bulletin OA-100 – "Westvaco Diacid," July 1972.

*Primary Examiner*—Harris A. Pitlick
*Attorney, Agent, or Firm*—Bernhard R. Swick; Joseph D. Michaels; Robert E. Dunn

[57] ABSTRACT

A novel antifreeze composition is provided which comprises a water soluble liquid alcohol freezing point depressant and an inhibitor. The freezing point depressant is preferably at least one water soluble alcohol containing from one to four carbon atoms inclusive and from one to four hydroxy groups inclusive such as ethylene glycol. The inhibitor comprises at least one substance selected from the group consisting of a. compounds corresponding to the following structural formula:

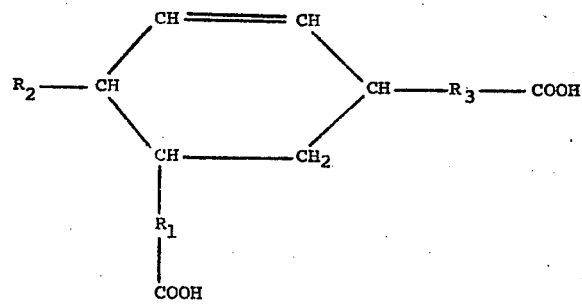

wherein $R_1$ is an alkylene radical containing from zero to 12 carbon atoms inclusive, $R_2$ is an alkyl radical containing from one to 10 carbon atoms inclusive and $R_3$ is an alkylene radical containing from one to 12 carbon atoms inclusive, and b. the mono- and di-metal salts, the mono- and di-ammonium salts, and the mono- and di-amides of compounds corresponding to the above structural formula. The presently preferred inhibitor comprises 1-carboxy-2-hexyl-5-(7-carboxyheptyl)-cyclohex-3-ene, or the mono- and di-metal salts, ammonium salts, and amides thereof. The inhibitor also aids in solublizing antifoam agents. The invention further provides a process for inhibiting the corrosion of solder alloys which employs the novel antifreeze composition of the invention.

39 Claims, No Drawings

CORROSION INHIBITED ANTIFREEZE COMPOSITIONS AND PROCESS FOR INHIBITING THE CORROSION OF SOLDER ALLOYS

THE BACKGROUND OF THE INVENTION

1. The Field of the Invention

The present invention broadly relates to corrosion inhibited antifreeze compositions which are especially useful as coolants in heat exchange systems. In some of its more specific variants, the invention is concerned with a novel antifreeze composition and with a process employing the same to reduce the rate of corrosion of solder alloys used in automotive cooling systems.

2. The Prior Art

The concentrated prior art antifreeze compositions adapted to be diluted with water and used as coolants for internal combustion engines usually contain a major amount of a liquid water soluble alcohol as a freezing point depressant, about 0.5–5% by weight of additives, and the balance water. The freezing point depressant is usually ethylene glycol, but other water soluble alcohols are used to some extent. The additives may include one or more prior art corrosion inhibitors, an antifoam agent and/or a water pump lubricant. Often a combination of corrosion inhibitors provides greater protection against corrosion as the cooling system of a typical internal combustion engine contains a substantial number of different metals in contact with the circulating coolant.

a wide variety of inhibitors have been proposed heretofore for use in antifreeze compositions. Several examples of the prior art inhibitors include inorganic compounds such as metal phosphates, borates, molybdates, arsenates, arsenites, nitrates, nitrites and chromates, and various organic compounds such as mercaptobenzothiazole, benzotriazole, piperazine, propynyloxynitrobenzene, bis-(nitrohydroxyphenyl)-pentanoic acid, and certain carboxylic acids which differ markedly from the inhibitor disclosed herein.

The corrosion inhibitors available heretofore, have not been entirely satisfactory in all respects. For example, the prior art corrosion inhibitors do not aid in solubilizing the antifoam agents commonly used in antifreeze compositions and in a number of instances may even render it more difficult to dissolve a sufficient amount to be effective for the intended purpose. This is especially true of inhibitors added for the purpose of reducing the rate of corrosion of solder alloys which are used extensively in automotive cooling systems. As a result, the prior art antifreeze compositions often were deficient in their antifoam properties and/or they lacked outstanding inhibition properties in respect to reducing the corrosion rate of solder. These two properties are very important and both should be present to a maximum degree in an ideal antifreeze composition. However, such an antifreeze composition was not available prior to the present invention.

THE SUMMARY OF THE INVENTION

The present invention provides a novel antifreeze composition comprising a water soluble liquid alcohol as a freezing point depressant and a markedly superior inhibitor which is described in greater detail hereinafter. The antifreeze composition is especially effective in reducing the rate of corrosion of metals used in automotive cooling systems. The inhibitor has the additional important property of solubilizing antifoam agents of the types commonly used in antifreeze compositions thereby allowing an optimum amount of an antifoam agent of limited solubility to be added. The resultant antifreeze composition is capable of providing a maximum degree of corrosion protection for solder alloys in combination with outstanding antifoam properties. This combination of optimum properties was not found in the prior art antifreeze compositions.

The detailed description of the preferred variants of the invention and the specific examples appearing hereinafter may be referred to for a more complete and comprehensive understanding of the invention.

THE DETAILED DESCRIPTION OF THE INVENTION INCLUDING PRESENTLY PREFERRED VARIANTS THEREOF

The antifreeze composition of the present invention comprises at least one water soluble liquid alcohol as a freezing point depressant and the markedly superior inhibitor of the invention. As will be described in greater detail hereinafter, when desired other prior art additives may be present in accordance with conventional practice.

The freezing point depressant may be any suitable water soluble liquid alcohol which has been used heretofore in formulating antifreeze compositions. In most instances, water soluble alcohols containing from one to four carbon atoms inclusive and from one to four hydroxy atoms inclusive are used as freezing point depressants. Ethylene glycol is presently preferred as the freezing point depressant, and especially the commercially available mixtures containing largely ethylene glycol and a small amount of diethylene glycol. The commercial mixture generally contains at least 85–95% by weight of ethylene glycol and the remainder diethylene glycol and small amounts of other substances which are incidentally present such as water. When desired, other water soluble liquid alcohols may be admixed with ethylene glycol but such admixtures usually are not preferred. Inexpensive commercially available water soluble alcohols such as methyl, ethyl, propyl and isopropyl alcohol may be used along or in admixtures. These latter alcohols are more volatile than ethylene glycol and diethylene glycol and are not preferred due to loss of the freezing point depressant through evaporation at the normal operating temperature of the cooling systems for internal combustion engines.

The inhibitor of the invention is at least one compound a. corresponding to the following structural formula:

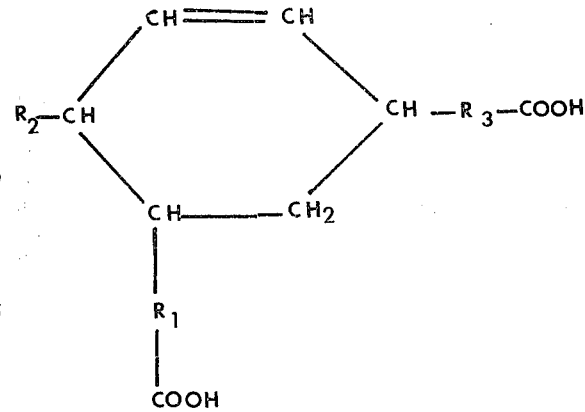

wherein $R_1$ is an alkylene radical containing from zero to 12 carbon atoms inclusive, $R_2$ is an alkyl radical containing from one to 10 carbon atoms inclusive, and $R_3$ is an alkylene radical containing from one to 12 carbon atoms inclusive, and/or b. the mono- and di-metal salts, mono- and di-ammonium salts, and/or mono and di-amides of compounds corresponding to the structural formula appearing in (a) above.

Better results are usually obtained in instances where $R_1$ contains from zero to four carbon atoms inclusive, $R_2$ contains from four to eight carbon atoms inclusive, and $R_3$ contains from five to nine carbon atoms inclusive. Preferably, $R_1$ contains zero carbon atoms, $R_2$ contains six carbon atoms and $R_3$ contains seven carbon atoms. More specifically, the presently preferred inhibitor is 1-carboxy-2-hexyl-5-(7-carboxyheptyl)-cyclohex-3-ene and/or the mono- and di-metal salts, ammonium salts, and amides thereof.

The free acid form of the inhibitor illustrated in the above structural formula may be used alone, or the above described mono- and di-metal salts, ammonium salts, and amide derivatives thereof may be used alone, or an admixture of two or more of these substances may be used. In instances where a mono- and/or di-metal salt is employed, often the alkali metal salts and/or the alkaline earth metal salts give better results but it is understood that other suitable metal salts may be used. The ammonium, sodium and potassium salts are usually preferred. The inhibitor in the form of the free acid may be reacted with a wide variety of organic amines to form the corresponding mono- and di- amide derivatives. Any suitable amine may be used, such as open chain amines containing 1–10 and preferably 1–4 carbon atoms, cycloaliphatic amines and/or heterocyclic amines containing 4–10 and preferably 5–8 carbon atoms, and aromatic amines containing 6–12 and preferably 6–9 carbon atoms. Hydroxy amines such as mono-, di-, and tri- hydroxy alkyl amines may be reacted with the free acid to prepare excellent inhibitors. The presently preferred mono- and di- amides are prepared by reacting the free acid with one or more of the various ethanol amines such as mono-, di- and tri- ethanol amine.

As a general rule, the above described mono- and di-metal salts, ammonium salts, and amides are well known and may be prepared following the general procedures of the prior art in synthesizing mono- and di- inorganic base salts and organic base salts of di-carboxylic acids. For example, in instances where the inorganic base or organic base is water soluble, it may be dissolved in water in an amount sufficient to produce the desired mono- and/or di- derivative, and then the free dicarboxylic acid may be added with stirring. The resulting reaction mixture may be heated to an elevated reaction temperature if desired, such as 50–100°C, but often room temperature is satisfactory. In instances where the inorganic base or organic base is soluble in an organic solvent, then the organic solvent may be substituted for water in the above-described preparation procedure. Examples of organic solvents include normally liquid alcohols, ethers, ketones, hydrocarbons, chlorinated hydrocarbons, and the like. In instances when it is desired to prepare the mono- metal salt, ammonium salt, or amide, then it is understood that equimolar quantities of the inorganic base and/or organic base are reacted with the free acid, and thus the reaction mixture contains the necessary ratio of reactants to achieve this goal. Similarly, in instances when the di-metal salt, ammonium salt, or amide is to be prepared, then the reaction mixture contains a ratio of the free acid to the inorganic base and/or organic base which results in the reaction of two moles thereof with the free acid. The mono- and di- metal salt, ammonium salt or amide thus prepared may be recovered from the reaction mixture following general prior art procedures. In some instances, the reaction mixture may be used without isolating or recovering the pure product. In instances when the product is recovered, this may be accomplished by cooling the reaction mixture and/or by evaporating the solvent sufficiently to cause the product to precipitate out upon cooling and allow recovery by filtration, decanting and the like.

The inhibitor is present in the antifreeze composition in a minor but effective amount to inhibit the corrosion of metals used in cooling systems for water cooled internal combustion engines, and especially solder or metals used in preparing solder alloys such as tin and lead. The inhibitor may be added, for example, in an amount of about 0.1–1% by weight of the antifreeze composition, and preferably in an amount of about 0.3–0.6%. The best results are usually achieved at levels of approximately 0.3% by weight. While the above mentioned quantities are generally satisfactory, it is understood that in some instances smaller or larger quantities may be used as it is only necessary that the inhibitor be present in a concentration which inhibits the corrosion of solder alloys and/or other metals contacted thereby in automotive cooling systems.

The antifreeze composition of the present invention may be formulated by admixing and/or dissolving the inhibitor in the water soluble liquid alcohol freezing point depressant in the concentrations set out above. As a general rule, the method of formulating the antifreeze composition need not differ from that of the prior art with the exception of providing the novel inhibitor.

In addition to the above mentioned essential ingredients, the antifreeze composition also may contain other prior art additives as is conventional in this art. Often it is desirable that a plurality of selected prior art inhibitors be used in combination with the novel inhibitor of this invention. This assures that the corrosion of all metals used in automotive cooling systems is reduced to a minimum. Examples of other inhibitors which may be present include inorganic compounds such as metal phosphates, borates, molybdates, arsenates, arsenites, nitrates, nitrites and chromates, and organic compounds such as mercaptobenzothiazole, benzotriazole, piperazine, propynyloxynitrobenzene, bis-(nitrohydroxyphenol)-pentanoic acid, and certain other carboxylic acids which differ markedly from the inhibitor disclosed herein. Usually the ammonium or alkali metal salts are preferred. Prior art inhibitors which are especially useful in combination with the inhibitors of the invention include alkali metal borates, alkali metal phosphates, and alkali metal mercaptobenzothiazole. Often sodium borate, potassium acid phosphate, and sodium mercaptobenzothiazole are the best prior art inhibitors to be used in conjunction with the inhibitor of the present invention. Such prior art inhibitors may be employed in the quantities described in the prior art, and usually are present in a total amount of less than 10%, and often in a total amount of approximately 1–5%.

Other additives which may be present include prior art antifoam agents, water pump lubricants, acid-base indicators, dyes and the like. Such additives may be employed in the quantities described in the prior art. Suitable antifoam agents include conventional silicone antifoam agents, aliphatic alcohols of 10 carbon atoms or more, organic phosphates and phthalates, conventional nonionic synthetic detergents, etc., having the desired properties. It is often possible to add more of the antifoam agent than is normally present due to the desirable hydrotropic properties of the inhibitor of the present invention. Thus, as a general rule, it is possible to add the antifoam agent in quantities sufficient to impart optimum properties. The antifoam agents described herein are added in an amount effective to control foaming such as about 0.001–0.5% by weight and preferably about 0.01–0.1% by weight.

The inhibitor of the present invention is especially useful in solubilizing antifoam agents which are alkoxylated nonionic surfactants exhibiting low foaming characteristics. Examples of alkoxylated nonionic synthetic detergents which may advantageously be employed in the antifreeze compositions of the invention as antifoam agents include polyoxyalkylene adducts of hydrophobic bases. Ethylene oxide, for example, is condensed with the hydrophobic base in an amount sufficient to impart water solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates. In general, the amount of ethylene oxide is less than 20% of the weight of hydrophobic base.

Typical hydrophobic bases which can be condensed with ethylene oxide in order to prepare nonionic surface active agents include mono- and polyalkyl phenols and the compounds prepared by condensing polyoxypropylene onto a base having from about one to six carbon atoms and at least one reactive hydrogen atom. The hydrocarbon ethers such as the benzyl or lower alkyl ether of the polyoxyethylene surfactant condensates are also advantageously employed in the compositions of the invention.

Further suitable nonionic surface active agents are the polyoxyethylene esters of higher fatty acids having from about eight to 22 carbon atoms in the acyl group. Typical products are the polyoxyethylene adducts of tall oil, rosin acids, lauric, stearic and oleic acids, and the like. Additional nonionic surface active agents are the polyoxyethylene condensates of higher fatty acid amines and amides having from about eight to 22 carbon atoms in the fatty alkyl or acyl group. Illustrative products are coconut oil, fatty acid amines and amides condensed with ethylene oxide.

Other suitable polyoxyethylene nonionic surface active agents are the ethylene oxide adducts of higher aliphatic alcohols and thioalcohols having from about 8 to 22 carbon atoms in the aliphatic portion. A typical product is tridecyl alcohol condensed with ethylene oxide.

Other suitable nonionic surface active agents are cogeneric mixtures of conjugated polyoxyalkylene compounds containing in their structure at least one hydrophobic oxyalkylene chain in which the oxygen/carbon atom ratio does not exceed 0.40 and at least one hydrophilic oxyalkylene chain in which the oxygen/carbon atom ratio is greater than 0.40. In accordance with the preferred practice of this invention, the hydrophilic oxyalkylene chain is less than 20% of the total weight of the oxyalkylene chain.

Polymers of oxyalkylene groups obtained from propylene oxide, butylene oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains having an oxygen/carbon atom ratio not exceeding 0.40. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide and styrene oxide are illustrative of hydrophilic oxyalkylene chains having an oxygen/carbon atom ratio greater than 0.40.

Among the conjugated polyoxyalkylene compounds which can be used in the compositions of the invention are those which correspond to the formula:

$$Y(C_3H_6O)_n(C_2H_4O)_mH$$

wherein Y is the residue of an organic compound having from about one to six carbon atoms and one reactive hydrogen atom, $n$ has an average value of at least about 6.4 as determined by hydroxyl number and $m$ has a value such that the oxyethylene portion constitutes up to about 20 weight percent of the molecule. These surface active agents are more particularly described in U.S. Pat. No. 2,677,700.

Other conjugated polyoxyalkylene surface active agents which are most advantageously used in the compositions of the invention correspond to the formula:

$$Y[(C_3H_6O)_n(C_2H_4O)_mH]_x$$

wherein Y is the residue of an organic compound having from about two to six carbon atoms and containing $x$ reactive hydrogen atoms in which $x$ has a value of at least about 2, $n$ has a value such that the molecular weight of the polyoxypropylene hydrophobic base is at least about 900 and $m$ has a value such that the oxyethylene content of the molecule is up to about 20 weight percent. Compounds falling within the scope of the definition for Y include, for example, propylene glycol, glycerine, pentaerythritol, trimethylolpropane, ethylene diamine, and the like. As already noted, the oxypropylene chains optionally, but advantageously, contain small amounts of ethylene oxide and the oxyethylene chains also optionally, but advantageously, contain small amounts of other alkylene oxides such as propylene oxide and butylene oxide.

The polyoxypropylene-polyoxyethylene block copolymers useful as low foaming nonionic surfactants include compounds corresponding to the structural formula:

$$HO(C_2H_4O)_a(C_3H_6O)_b(C_2H_4O)_cH$$

having a molecular weight of from about 900 to 4,500 and wherein $a$ and $c$ have values such that the ethylene oxide residua comprise from zero to about 20% by weight of the total molecular weight of the copolymer. Copolymers of this type are usually prepared by condensing ethylene oxide with polypropylene glycol, polypropylene glycol in turn being the condensation reaction product of propylene oxide and propylene glycol. These compositions are more particularly described in U.S. Pat. No. 2,674,619.

Other suitable nonionic surface active agents include ethoxylated and propoxylated adducts of ethylenediamine of a type generally described in u.S. Pat. No. 2,979,528 but restricted to compounds exhibiting low foaming characteristics such as nonionic surfactants corresponding to the following structural formula:

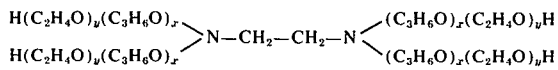

having a total molecular weight of from 900 to 7,800, and wherein $y$ is an integer having a value which insures that the ethylene oxide residua constitute a maximum of about 20% by weight of the total molecular weight of the molecule. Compounds of this type may be prepared by the sequential addition of propylene oxide and ethylene oxide to ethylene diamine under oxyalkylation conditions.

Especially suitable alkoxylated linear aliphatic alcohols may contain 8-20 carbon atoms and preferably about 12-18 carbon atoms, and the alkylene oxide residua may comprise 5-40% by weight and preferably about 10-20% by weight of the molecule. The linear aliphatic alcohols are preferably ethyoxylated and/or propoxylated under prior art alkoxylation conditions.

Additional low foaming nonionic surface active agents are disclosed in U.S. Pat. Nos. 3,340,309, 3,504,041 and 3,770,701. Still other suitable low foaming polyoxyalkylene compounds are disclosed in U.S. Pat. No. 2,425,755. The disclosures of low foaming nonionic surface active agents in the above mentioned United States Patents are incorporated herein by reference.

The various types of nonionic surfactants disclosed herein may be used individually as antifoam agents, or admixtures thereof may be employed. Preferred admixtures comprise a weight ratio of the above described ethoxylated and propoxylated adduct of ethylenediamine to one or more of the remaining nonionic surfactants ranging from about 2:1 to 1:2, and for best results the weight ratio is about 1:1. The inhibitor of the present invention is especially effective as a hydrotrope for antifoam agents of the foregoing types when used in antifreeze compositions.

The resultant antifreeze composition is a concentrate which may be diluted with water in accordance with prior art practice to produce an antifreeze fluid having the desired freezing point. It is understood that the quantities of inhibitor described herein are based upon the concentrate, as distinguished from the diluted concentrate which is actually used as a coolant in cooling systems for internal combustion engines. As a general rule, the concentrate may be diluted with about 1 to 3 volumes of water to arrive at the coolant fluid which is circulated in the cooling system. Smaller or larger quantities of water may be added as necessary to avoid freezing of the coolant.

The inhibitor of the present invention also may be added to prior art antifreeze compositions which contain initially one or more additional inhibitors. In such instances, the corrosion of solder alloys is further inhibited. The inhibitor of the present invention also prevents "solder flowering," which is an undesirable bulky buildup of a thick layer of corrosion products on the surface of solder alloys.

The foregoing detailed description and the following specific examples are for purposes of illustration only, and are not limiting to the spirit or scope of the appended claims. All references to percentages appearing in the specification and claims are by weight unless otherwise indicated.

EXAMPLE I

Three antifreeze formulations were prepared from commercial ethylene glycol and various additives. The compositions of the three antifreeze formulations are given below in Table I.

TABLE I

| Component | Antifreeze Formulations (Weight Percent) | | |
|---|---|---|---|
| | 1 | 2 | 3 |
| Ethylene Glycol | 89.42 | 88.84 | 90.70 |
| Diethylene Glycol | 4.30 | 4.89 | 5.00 |
| $Na_2B_4O_7 \cdot 5H_2O$ | 0.13 | 0.13 | 1.32 |
| $K_2HPO_4$ | 2.75 | 2.56 | — |
| Sodium mercaptobenzothiazole (50% aqueous solution) | 1.40 | 1.20 | 0.15 |
| Water | 2.00 | 2.31 | 2.06 |
| NaOH (50% aqueous solution) | — | — | 0.72 |
| $NaNO_2$ | — | — | 0.05 |
| KOH (50% aqueous solution) | — | 0.02 | — |
| Antifoam Agent* | — | 0.05 | — |

*The antifoam agent was a low foaming polyoxyethylene adduct of a polyoxypropylene hydrophobic base having a molecular weight of about 1750 wherein the oxyethylene content is about 10 weight percent of the molecule.

The above three antifreeze formulations were tested with and without an inhibitor of the present invention to determine the degree of corrosion inhibition imparted thereby. The inhibitors used in the tests were 1-carboxy-2-hexyl-5-(7-carboxyheptyl)-cyclohex-3-ene and its disodium salt.

The tests were conducted on six solder compositions under the conditions set forth in Test A of the Chrysler Corporation publication entitled "Chrysler Corporation Laboratory Procedure No. LP461H94. Corrosion Tests for Engine Coolants." The solder compositions are set out in Table II below by weight percent.

Table II

| No. | Sn | Pb | Ag | Sb | Bi | Cu | Zn | Fe | As | Cd |
| --- | --- | --- | --- | --- | --- | --- | --- | --- | --- | --- |
| 1 | 6 | 93.5 | 0.52 | 0.006 | 0.015 | 0.001 | — | 0.001 | 0.008 | — |
| 2 | 5 | 94.5 | 0.52 | 0.004 | 0.015 | 0.001 | — | 0.001 | 0.008 | — |
| 3 | 4 | 95.5 | 0.52 | 0.004 | 0.015 | 0.001 | — | 0.001 | 0.006 | — |
| 4 | 3 | 96.5 | 0.51 | 0.004 | 0.015 | 0.001 | — | 0.001 | 0.004 | — |
| 5 | 5 | 95 | 0.001 | 0.006 | 0.015 | 0.001 | — | 0.001 | 0.004 | — |
| 6 | 30 | 70 | — | 0.001 | 0.006 | 0.001 | — | 0.001 | 0.008 | — |

In conducting Test A, six brass specimens were coated individually with double dip solder using the six solder alloys of Table II. Thus, six specimens were provided for testing, each of which was a brass base having two superimposed coatings of one of the solder alloys. An uncoated brass impingement specimen was also provided. The six brass specimens coated with the solder compositions and the uncoated brass impingement specimen all had the same alloy composition, i.e., brass alloy SAE CA-260 (brass alloy No. 6. conforming to ASTM B36, containing 68.5–71.5% copper. 0.05% iron 0.07% lead and the remainder zinc).

The antifreeze formulation to be tested was diluted with tap water to provide an antifreeze solution containing 44% by weight of the concentrated antifreeze formulation of Table I and 56% by weight of water. In one series of runs, the inhibitor was omitted, and in another series of runs an inhibitor was added to the concentrated antifreeze formulation so as to provide comparative data. The concentration of the inhibitor was based on the concentrated antifreeze formulation, and varied between 0.1% and 0.4% by weight as indicated in the data appearing hereinafter.

The antifreeze solution to be tested was placed in a test cell provided with a brass cathode having the same composition as the brass impingement specimen and was electrically connected to the negative terminal of a 1½ Volt DC battery. The six solder coated specimens to be tested were galvanically connected and immersed into the antifreeze solution. The impingement specimen was also immersed into the antifreeze solution and electrically connected to the positive terminal of the 1½ Volt DC battery. An electrical potential of 1.5 Volts DC was maintained between the brass impingement specimen, which acted as an anode, and the brass cathode. The solder coated specimens were positioned between the anode and cathode.

Oxygen was bubbled through the antifreeze solution and the temperature thereof was maintained at 180°F. Each test was conducted on an uninterrupted basis for 336 hours, during which time the antifreeze solution was circulated and a stream thereof was impinged upon the brass impingement specimen.

At the end of the 336 hour test period, the six solder coated brass specimens and the brass impingement specimen were removed from the antifreeze solution, visually examined, cleaned and weight loss or gain of the impingement specimens was determined. The various specimens for each run were given two numerical visual ratings, i.e., 1–5, the first number of which refers to corrosion buildup and the second number of which refers to erosion. The visual ratings in each instance are from 1 to 5, i.e., 1 refers to no corrosion buildup or erosion on the group of specimens for a given run, and 5 refers to heavy corrosion buildup or erosion. The data thus obtained appear in Table III below.

TABLE III

Test A Results

| Test No. | Antifreeze Formulation | Inhibitor* wt. % | Weight Loss (mg) Impingement Specimen | Visual Rating |
| --- | --- | --- | --- | --- |
| 1 | 1 | — | 33 | 2–4 |
| 2 | 1 | 0.2 | 17 | 1–3 |
| 3 | 1 | 0.3 | 20 | 1–3 |
| 4 | 2 | — | 138 | 2–4 |
| 5 | 3 | — | 294 | 3–4 |
| 6 | 3 | 0.2 | — | 2–4 |
| 7 | 3 | 0.3 | 36 | 1–3 |
| 8 | 3 | 0.4 | 51 | 2–4 |
| 9 | 1 | 0.4 | 24 | — |

*The inhibitor was 1-carboxy-2-hexyl-5-(7-carboxyheptyl)-cyclohex-3-ene for Tests 1–8 and the disodium salt thereof for Test 9.

The above data show that the inhibitor of the invention reaches both weight loss due to corrosion of the specimens and undesirable corrosion buildup on the specimens.

EXAMPLE II

The general procedure of Example I was followed in this Example with the exception of substituting the conditions and procedure of Chrysler Corporation Test B for Chrysler Corporation Test A. Test B is disclosed in the publication referred to in Example I and differs from Test A in that the antifreeze formulation is diluted with distilled water in an amount to produce an antifreeze solution containing 50% of the concentrated antifreeze formulation of Table I and 50% by weight of distilled water. Additionally, the six specimens to be tested are a brass specimen double dipped in solder alloy No. 2, solid solder alloy No. 6, brass, steel, cast iron and aluminum. Only the steel, cast iron and aluminum specimens are galvanically connected when immersed in the antifreeze solution. The remaining three specimens are individually insulated. The brass impingement specimen, brass cathode and other apparatus and procedures are as set out in Experiment I with the exception of omitting the visual rating.

The six specimens were tested using antifreeze formulation No. 1 containing 0.2% by weight of 1-carboxy-2-hexyl-5-(7-carboxyheptyl)-cyclohex-3-ene as the inhibitor.

The following data were obtained:

TABLE IV

Test B Results

| Specimen | Weight Gain or Loss (mg) |
| --- | --- |
| Brass Coated With Solder Alloy No. 2 | −7 |
| Solid Solder Alloy No. 2 | −2 |
| Brass Test Specimen | −31 |
| Steel | −1 |
| Cast Iron | +3 |
| Aluminum | +2 |
| Brass Impingement Specimen | −8 |

The data in Table IV show that all specimens lost small amounts of weight with the exception of the cast iron and aluminum specimens which gained 3 mg. and 2 mg., respectively. The weight losses are generally markedly less in the presence of the inhibitor than when it is omitted.

EXAMPLE III

The general procedure of Example II was followed in this Example with the exception of substituting Chrysler Corporation Test C for Chrysler Corporation Test B. Test C is disclosed in the publication referred to in Example I and differs from Test B in the dilution of the concentrated antifreeze formulation. In Test C, the concentrated antifreeze formulation is diluted with tap water in an amount to prepare an antifreeze solution containing 44% by weight of the concentrated antifreeze formulation and 56% by weight of water. Test C is identical with Test B in all other respects.

The six specimens were tested using antifreeze formulation No. 1 containing 0.2% of 1-carboxy-2-hexyl-5-(7-carboxyheptyl)-cyclohex-3-ene as the inhibitor. The following data were obtained:

TABLE V

Test C Results

| Specimen | Weight Gain or Loss (mg.) |
|---|---|
| Brass Coated With Solder Alloy No. 2 | −19 |
| Solid Solder Alloy No. 2 | −1 |
| Brass Test Specimen | −6 |
| Steel | −3 |
| Cast Iron | +4 |
| Aluminum | +1 |
| Brass Impingement Specimen | −22 |

The data in Table V show that the cast iron and aluminum specimens gained 4 mg. and 1 mg. respectively, and the remaining specimens lost weight. The weight losses are generally markedly less in the presence of 0.2% of the inhibitor than when it is omitted.

EXAMPLE IV

The general procedure of Example II was followed in this Example with the exception of substituting Chrysler Corporation Test D for Chrysler Corporation Test B. Test D is disclosed in the publication referred to in Example I and differs from Chrysler Corporation Test C in the dilution of the concentrated antifreeze formulation. In conducting Test D, the concentrated antifreeze formulation is diluted with distilled water containing 500 parts per million of chloride ion in amounts to provide an antifreeze solution containing 20% by weight of the concentrated antifreeze formulation and 80% by weight of the chloride ion-containing distilled water.

The six specimens were tested using antifreeze formulation No. 1 or No. 3 and with or without an inhibitor as indicated in the data in Table VI. The following data were obtained:

TABLE VI

Test D Results

| Test No. | Antifreeze formulation | Inhibitor* wt. % | Specimen** Weight Loss (mg) | | | | | | |
|---|---|---|---|---|---|---|---|---|---|
| | | | 1 | 2 | 3 | 4 | 5 | 6 | 7 |
| 1 | 1 | 0.2 | 16 | 13 | 4 | 4 | 15 | 134 | 11 |
| 2 | 3 | — | 182 | 857 | 5 | 667 | | 381 | 1147 |
| 3 | 3 | 0.2 | 68 | 235 | — | 93 | 434 | 305 | — |
| 4 | 3 | 0.3 | 87 | 231 | — | 43 | 802 | 292 | 1056 |
| 5 | 3 | 0.4 | 45 | 206 | — | 21 | 534 | 352 | 540 |

*The inhibitor was 1-carboxy-2-hexyl-5-(7-carboxyheptyl)-cyclohex-3-ene for Tests 1–5.
**The specimens 1–7 were as follows:
1. Brass Coated with Solder Alloy No. 2
2. Solid Solder Alloy No. 2
3. Brass Test Specimen
4. Steel
5. Cast Iron
6. Aluminum
7. Brass Impingement Specimen The data in Table VI show that the inhibitor also markedly reduces weight loss under the severe test conditions of this Example.

We claim:

1. A corrosion inhibited antifreeze composition comprising a water soluble liquid alcohol freezing point depressant and an inhibitor, the inhibitor being present in the antifreeze composition in an amount effective to inhibit the corrosion of solder alloys when intimately contacted therewith, the inhibitor being present in an amount of about 0.01–1% by weight and comprising at least one substance selected from the group consisting of a. compounds corresponding to the structural formula:

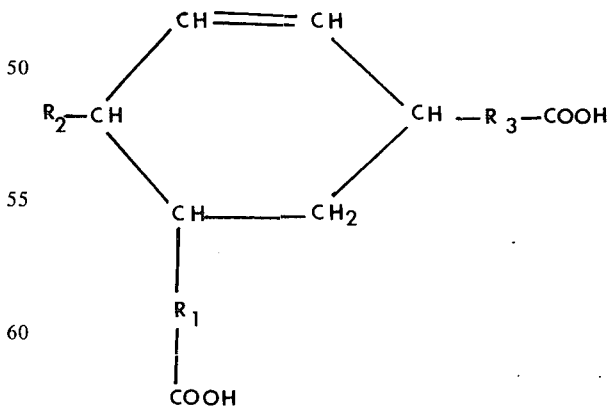

wherein $R_1$ is an alkylene radical containing from zero to 12 carbon atoms inclusive, $R_2$ is an alkyl radical containing from one to 10 carbon atoms inclusive and $R_3$ is an alkylene radical containing from one to 12 carbon atoms inclusive, and
   b. the mono- and di- metal salts, the mono- and di- ammonium salts and the mono- and di- amides of (a).

2. The antifreeze composition of claim 1 wherein $R_1$ contains from zero to four carbon atoms inclusive, $R_2$ contains from four to eight carbon atoms inclusive, and $R_3$ contains from five to nine carbon atoms inclusive.

3. The antifreeze composition of claim 1 wherein the inhibitor comprises 1-carboxy-2-hexyl-5-(7-carboxyheptyl)-cyclohex-3-ene.

4. The antifreeze composition of claim 1 wherein the inhibitor is present in an amount of about 0.3–0.6% by weight.

5. The antifreeze composition of claim 1 wherein the inhibitor is present in an amount of about 0.3% by weight.

6. The antifreeze composition of claim 1 wherein the freezing point depressant comprises at least one water soluble alcohol containing from one to four carbon atoms inclusive and from one to four hydroxy atoms inclusive.

7. A corrosion inhibited antifreeze composition comprising ethylene glycol as a freezing point depressant and an inhibitor, the inhibitor being present in the antifreeze composition in a minor but effective amount to inhibit the corrosion of solder alloys when intimately contacted therewith, and the inhibitor comprising at least one substance selected from the group consisting of
   a. compounds corresponding to the structural formula:

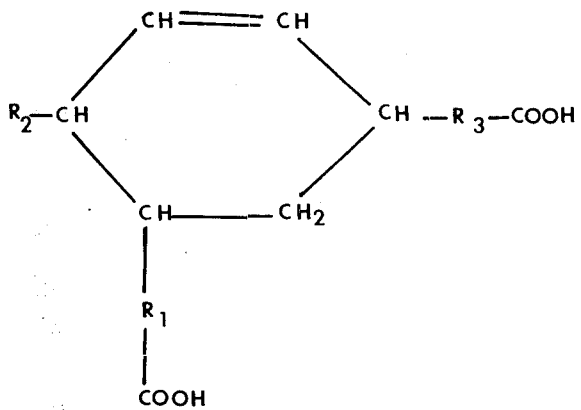

wherein $R_1$ is an alkylene radical containing from zero to 12 carbon atoms inclusive, $R_2$ is an alkyl radical containing from one to 10 carbon atoms inclusive and $R_3$ is an alkylene radical containing from one to 12 carbon atoms inclusive, and
   b. the mono- and di- metal salts, the mono- and di- ammonium salts and the mono- and di- amides of (a).

8. The antifreeze composition of claim 7 wherein $R_1$ contains from zero to four carbon atoms inclusive, $R_2$ contains from four to eight carbon atoms inclusive, and $R_3$ contains from five to nine carbon atoms inclusive.

9. The antifreeze composition of claim 7 wherein $R_1$ contains zero carbon atoms, $R_2$ contains six carbon atoms, and $R_3$ contains seven carbon atoms.

10. The antifreeze composition of claim 7 wherein the inhibitor is present in an amount of about 0.01–1% by weight.

11. The antifreeze composition of claim 7 wherein the inhibitor is present in an amount of about 0.3–0.6% by weight.

12. The antifreeze composition of claim 7 wherein the inhibitor is present in an amount of about 0.3% by weight.

13. A corrosion inhibited antifreeze composition comprising a water soluble liquid alcohol freezing point depressant, an antifoam agent and an inhibitor, the inhibitor being present in the antifreeze composition in a minor but effective amount to inhibit the corrosion of solder alloys when intimately contacted therewith, and the inhibitor comprising at least one substance selected from the group consisting of
   a. compounds corresponding to the structural formula:

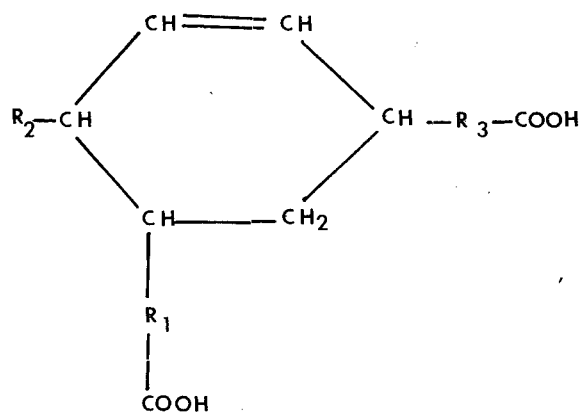

wherein $R_1$ is an alkylene radical containing from zero to 12 carbon atoms inclusive, $R_2$ is an alkyl radical containing from one to 10 carbon atoms inclusive and $R_3$ is an alkylene radical containing from one to 12 carbon atoms inclusive, and
   b. the mono- and di- metal salts, the mono- and di- ammonium salts and the mono- and di- amides of (a).

14. The antifreeze composition of claim 13 wherein $R_1$ contains from zero to four carbon atoms inclusive, $R_2$ contains from four to eight carbon atoms inclusive, and $R_3$ contains from five to nine carbon atoms inclusive.

15. The antifreeze composition of claim 13 wherein the inhibitor comprises 1-carboxy-2-hexyl-5-(7-carboxyheptyl)-cyclohex-3-ene.

16. The antifreeze composition of claim 13 wherein the inhibitor is present in an amount of about 0.01–1% by weight.

17. The antifreeze composition of claim 13 wherein the inhibitor is present in an amount of about 0.3–0.6% by weight.

18. The antifreeze composition of claim 13 wherein the inhibitor is present in an amount of about 0.3% by weight.

19. The antifreeze composition of claim 13 wherein the freezing point depressant comprises at least one water soluble alcohol containing from one to four carbon atoms inclusive and from one to four hydroxy atoms inclusive.

20. The antifreeze composition of claim 13 wherein the freezing point depressant comprises ethylene glycol.

21. The antifreeze composition of claim 13 wherein the antifoam agent comprises an alkoxylated nonionic surfactant which exhibits low foaming characteristics.

22. The antifreeze composition of claim 13 wherein the antifoam agent comprises a polyoxypropylenepolyoxyethylene block copolymer corresponding to the formula:

$$HO(C_2H_4O)_a(C_3H_6O)_b(C_2H_4O)_cH$$

wherein the copolymer has a molecular weight of from about 900 to 4,500 and $a$ and $c$ are of a size whereby the $(C_2H_4O)$ groups comprise from zero to about 20% by weight of the total molecular weight of the copolymer.

23. The antifreeze composition of claim 1 wherein the freezing point depressant comprises ethylene glycol, $R_1$ contains zero carbon atoms, $R_2$ contains six carbon atoms and $R_3$ contains seven carbon atoms.

24. The antifreeze composition of claim 23 wherein an antifoam agent is also present.

25. The antifreeze composition of claim 24 wherein the antifoam agent comprises an alkoxylated nonionic surfactant which exhibits low foaming characteristics.

26. The antifreeze composition of claim 24 wherein the inhibitor comprises 1-carboxy-2-hexyl-5-(7-carboxyheptyl)-cyclohex-3-ene and the antifoam agent comprises a polyoxypropylene-polyoxyethylene block copolymer corresponding to the formula:

$$HO(C_2H_4O)_a(C_3H_6O)_b(C_2H_4O)_cH$$

wherein the copolymer has a molecular weight of from about 900 to 4,500 and $a$ and $c$ are of a size whereby the $(C_2H_4O)$ groups comprise from zero to about 20% by weight of the total molecular weight of the copolymer.

27. The antifreeze composition of claim 26 wherein the inhibitor is present in an amount of about 0.3% by weight.

28. A process for inhibiting the corrosion of solder alloys which are in intimate contact with an antifreeze composition which comprises intimately contacting the surface of the solder alloy to be inhibited against corrosion with the antifreeze composition of claim 1.

29. A process for inhibiting the corrosion of solder alloys which are in intimate contact with an antifreeze composition which comprises intimately contacting the surface of the solder alloy to be inhibited against corrosion with the antifreeze composition of claim 3.

30. A process for inhibiting the corrosion of solder alloys which are in intimate contact with an antifreeze composition which comprises intimately contacting the surface of the solder alloy to be inhibited against corrosion with the antifreeze composition of claim 7.

31. A process for inhibiting the corrosion of solder alloys which are in intimate contact with an antifreeze composition which comprises intimately contacting the surface of the solder alloy to be inhibited against corrosion with the antifreeze composition of claim 9.

32. A process for inhibiting the corrosion of solder alloys which are in intimate contact with an antifreeze composition which comprises intimately contacting the surface of the solder alloy to be inhibited against corrosion with the antifreeze composition of claim 10.

33. A process for inhibiting the corrosion of solder alloys which are in intimate contact with an antifreeze composition which comprises intimately contacting the surface of the solder alloy to be inhibited against corrosion with the antifreeze composition of claim 13.

34. A process for inhibiting the corrosion of solder alloys which are in intimate contact with an antifreeze composition which comprises intimately contacting the surface of the solder alloy to be inhibited against corrosion with the antifreeze composition of claim 16.

35. A process for inhibiting the corrosion of solder alloys which are in intimate contact with an antifreeze composition which comprises intimately contacting the surface of the solder alloy to be inhibited against corrosion with the antifreeze composition of claim 20.

36. A process for inhibiting the corrosion of solder alloys which are in intimate contact with an antifreeze composition which comprises intimately contacting the surface of the solder alloy to be inhibited against corrosion with the antifreeze composition of claim 23.

37. A process for inhibiting the corrosion of solder alloys which are in intimate contact with an antifreeze composition which comprises intimately contacting the surface of the solder alloy to be inhibited against corrosion with the antifreeze composition of claim 24.

38. A process for inhibiting the corrosion of solder alloys which are in intimate contact with an antifreeze composition which comprises intimately contacting the surface of the solder alloy to be inhibited against corrosion with the antifreeze composition of claim 25.

39. A process for inhibiting the corrosion of solder alloys which are in intimate contact with an antifreeze composition which comprises intimately contacting the surface of the solder alloy to be inhibited against corrosion with the antifreeze composition of claim 27.

* * * * *

UNITED STATES PATENT AND TRADEMARK OFFICE
CERTIFICATE OF CORRECTION

PATENT NO. : 3,931,029
DATED : January 6, 1976
INVENTOR(S) : DANIEL R. DUTTON, JOHN W. COMPTON It is certified that error appears in the above-identified patent and that said Letters Patent are hereby corrected as shown below:

Column 1, line 32, "a" should read -- A --;
Column 2, line 43, "along" should read -- alone --;
Column 7, line 3, "u.S." should read -- U.S. --;
Column 7, line 25, "ethyoxylated" should read -- ethoxylated --;
Column 10, line 28, "reaches" should read -- reduces --;
Column 12, in Table VI, Test No. 2, the missing data
   for Specimen 5 should read -- 1038 --; and
Column 14, line 36, "containg" should read -- containing --.

Signed and Sealed this fourth Day of May 1976

[SEAL]

Attest:

RUTH C. MASON
Attesting Officer

C. MARSHALL DANN
Commissioner of Patents and Trademarks